Kiyoshi Inoue
INVENTOR.

BY Karl G. Ross
Attorney

Kiyoshi Inoue
INVENTOR.

Kiyoshi Inoue
INVENTOR.

BY
Karl F. Ross
Attorney

United States Patent Office 3,420,759
Patented Jan. 7, 1969

3,420,759
ELECTROMACHINING USING AN ELECTROLYTE HAVING SUBSTANTIALLY THE SAME RESISTIVITY AS THE ELECTRODE
Kiyoshi Inoue, 100 Sakato, Kawasaki, Kanagawa, Tokyo, Japan
Continuation-in-part of application Ser. No. 512,338, Dec. 8, 1965. This application July 5, 1966, Ser. No. 562,857
Claims priority, application Japan, Mar. 16, 1966, 41/16,693
U.S. Cl. 204—143           13 Claims
Int. Cl. B23p 1/00; B23p 1/08

This application is a continuation-in-part of my co-pending application Ser. No. 512,338, filed Dec. 8, 1965.

My present invention relates to the electrical removal of conductive material from a surface of a workpiece and, more particularly, to an improved technique for the electrochemical removal of a metallic material from a workpiece consisting thereof.

As has been pointed out in the aforementioned copending application, in recent years there has been considerable development of the arts of electrochemical and electric-discharge removal of metal from metallic workpieces juxtaposed with an electrode with or without mechanical action. For example, in the electric-discharge machining (EDM) methods, an electrode is spacedly juxtaposed with a metallic workpiece and electric pulses, generally from a capacitive means or other discharge device, are applied across the gap to generate a spark discharge which erodes the workpiece material as well as the electrode. The electrode is constantly fed toward the workpiece by servo means designed to maintain substantially constant the gap width between the electrode and the workpiece while a dielectric liquid flushes particles of the removed material from the gap and serves as a coolant. In electrochemical machining (ECM) a unidirectional electric current is applied across the electrode gap into which an electrolyte is introduced and the workpiece material is at least partly solubilized by electrochemical transformation at its interface with the electrolyte. Here, too, the exigencies of the method have required that a substantially constant working gap be maintained if an accurate control of the machining process and a substantially invariable operation is to be effected.

While various methods have been proposed for maintaining the gap in electrochemical machining processes, only two have been found to be practical to any large measure and these have involved some significant disadvantages. It has been proposed, for example, to use servomechanisms for accurately positioning the electrode with respect to the workpiece and for controlling the feed of the electrode in response to the condition of the gap as detected by suitable sensing means. Not only is such a system complex and costly, but considerable difficulty is involved in setting the mechanism for the optimum gap distance for the particular electrode material and/or the particular workpiece material. When it is considered that these difficulties are multiplied when relatively small gap sizes are to be used, it will be evident that considerable effort has gone into investigations of possible methods of avoiding the use of such mechanisms. In one such arrangement, the spacing is maintained by minute non-conductive spacing particles disposed between the workpiece and the machining surface of a conductive electrode. Thus, in one so-called "electrochemical grinder," a rotating wheel serves as the conductive electrode, this wheel being composed of metal and having a multiplicity of diamond particles imbedded therein to serve as the dielectric spacers for maintaining the gap between the metal surface of the electrode and the juxtaposed workpiece surface. Substantially 90% of the action of such an apparatus is electrochemical in nature while the remaining 10% is a mechanical abrasion of the workpiece surface which also serves to strip off the oxide layer formed thereon by electrochemical action and present on most metals even prior to the start of machining. Not only are metal-bonded diamond wheels considerably more expensive than is practical for most industrial applications, but such wheels provide some fluctuation of the working gap because of partial erosion of the metal of the electrode; thus, apparatus embodying such wheels should also be provided with control means for regulating the arc-type discharges which tend to bridge the interelectrode gap across which a direct-current electrolysis potential is applied.

Furthermore, the inherent instability of systems sensitive to variations in width of the electrode gap and requiring electrode gap stabilization makes it almost essential that the workpiece-supporting element and/or the electrode-tool support be relatively massive so as to reduce the vibratory effects on the gap width. This again increases the size of the unit and also limits its portability. Furthermore, like servo-mechanisms and gap-responsive sensing means, the device required for prevention of arcing at the interelectrode gap include electronic circuitry with special power supplies that are relatively expensive, difficult to adjust and prone to disorder. While the foregoing technological disadvantages of electrochemical erosion processes have hitherto limited the practical usefulness of conventional electrochemical-grinding equipment, some important problems arising from the very nature of the processes must also be considered. When an electrode is, for example, spacedly juxtaposed with a workpiece and an electrolyte floods the intervening servo-controlled gap, the electric current flowing across the gap is substantially an ion current whose erosion action is not limited merely to the juxtaposed surface of the workpiece and electrode but is also influenced markedly by the flow of the electrolyte. Thus, as the electrolyte flows over edges of the workpiece, it gives use to a substantial ion current remote from the electrode and tends to round off these edges by electrochemical machining action and even to undercut these edges, thereby reducing sharply the definition of the surface being machined. When the machining process is employed in the formation of dies, therefore, masking should be used to prevent undercutting and washout, or the workpiece must be subjected to a conventional mechanical machining process to eliminate these undesirable side effects. Others have observed, moreover, that the problem mentioned above cannot be solved merely by withdrawing the tools with respect to the workpiece and thereby increasing the machining gap, inasmuch as an increase in the machining gap leads to a reduction in the accuracy of the cutting operation. The power limit of the gap in conventional systems is also relatively well defined since, using conventional electrolytes, and servomechanisms or the metal-bonded diamond wheel mentioned above, for example, the reduction of the interelectrode gap will eventually lead to the formation of an arc which continuously jumps between the electrode and the workpiece. At a certain point, the means for suppressing the arc is forced to reduce the current supply to the electrode until machining is retarded.

In summary, therefore, it may be said that conventional electrochemical-grinding techniques have proved to be inconvenient because of the difficulties involved in maintaining a constant working gap between the machining electrode and the workpiece, in limiting the fluctuation of the gap width, in preventing arcing because of direct-current breakdown in a narrow gap and in preventing excessive widening of the gap with resulting inaccuracy.

These problems, mostly traceable to the presence of a well defined machining gap, have caused prior apparatus for this purpose to be relatively massive and expensive.

It is, accordingly, a principal object of the present invention to provide an improved method of electrical removal of material from a conductive workpiece whereby the aforedescribed disadvantages can be obviated.

A further object of this invention is to provide a method of electrochemically removing metallic workpiece material at a relatively high removal rate without sacrifice of accuracy and without an increase of the roughness produced by the machining operation. A corollary object of the invention is to provide a method of electrochemically removing workpiece material which will permit the workpiece to be obtained free from washout and undercutting, with a relatively smooth and even shiny surface free from mechanical deterioration of the machined surface, and with substantially any desired contour, without requiring expensive metal-bonded diamond wheels and the like.

Still another object of the invention is to provide an improved method of controlling an electrochemical machining operation whereby concern about the gap condition is obviated.

An additional object of this invention is to provide an improved method of electrochemically surfacing (i.e. grinding, honing or lapping) of a hard metallic workpiece (e.g. high-speed tool steel, tungsten carbide, titanium carbide) with a relatively inexpensive and easily contoured tool.

These objects and others which will become apparent hereinafter are attained, in accordance with my present invention which is based upon a discovery representing a new departure in the field of electrochemical machining. As originally set forth in my earlier-filed application mentioned above, I have found, surprisingly, that when a workpiece surface is juxtaposed with a completely conductive surface of an electrode, and the electrode and workpiece are urged toward interfacial contact under pressure, electrochemical machining of the workpiece can be effected when the interface is formed with pockets (such pockets being substantially always present when the natural surfaces of the electrode and the workpiece engage each other) containing an electrolyte which has a specific resistivity approximating that of the electrode, and a pulsating current is applied across the electrode and the workpiece. It is thus an essential of the present invention that either or both the conductive electrode and the workpiece members be continuously urged toward direct mutual contact, i.e. the electrode tends ideally to bear directly against the workpiece in what would amount to a short circuit under most operating conditions of conventional electrochemical machining devices. Because the electrolyte has a specific resistivity of the order of that of the electrode, the amount of electric current passing through the electrolyte pockets at the interface and between regions of actual direct contact with the workpiece is the major fraction of the overall current flow so that an electrochemical-machining current appears to flow in the region between the zones of actual contact. Thus, the method of the present invention comprises in its broader aspects the steps of urging a substantially completely conductive electrode surface toward contact with a workpiece surface under pressure, thereby forming substantially an interface between them; supplying an electrolyte having a specific resistivity of the order of that of the electrode to pockets at the interface between the electrode and the workpiece surfaces and between zones of direct contact of the electrode with the workpiece; and applying across the workpiece a pulsating electric current to effect electrochemical machining of the workpiece surface at the pockets. The workpiece and electrode surfaces are, of course, relatively displaced so that the pockets of electrolyte sweep along the workpiece surface and produce substantially uniform machining. The pulsating current can be applied by a pulsating source or can be generated in situ (e.g. by inherent vibration at the interface) when a direct current source is used. It will be understood that, while ideally it is desirable to maintain the initially established actual engagement of the electrode with the workpiece over the entire machining operation, in practice the formation of electrolyte vapors and gases at the interface effectively counters the pressure urging the workpiece and electrode together and results in the formation of a slight gap (ranging from zero at regions of actual engagement to hundredths of a millimeter). The natural irregularity of the electrode and/or workpiece does, however, ensure actual contact in the course of the machining operation (albeit for relatively short periods) and this contact is frequently accompanied by a spark discharge through the oxide layer formed on the workpiece by the electrolyte action. The impulsive characteristic of the discharge facilitates loosening and removal of the oxide film. Thus, when reference is made herein to the "actual engagement" of the electrode with the workpiece, it is to be understood that such engagement may be with the oxide film as well as the metallic surface and may even permit the presence of an intervening (molecular) film of electrolyte. It is an object of this invention, therefore, to urge the continuous and completely conductive electrode surface as completely as possible toward the direct contact mentioned above, by contrast with earlier systems requiring various means for sustaining the machining gap. In the present system, any gap is formed by the development in situ of forces resisting the pressure urging the electrode and workpiece together.

According to a most important feature of this invention, the specific resistivity of the *electrode* ranges between substantially 0.001 ohm-cm. and 10 ohm-cm. while the *electrolyte* has a specific resistivity of a corresponding order of magnitude. In practice, it has been found that the specific resistivity of the electrolyte may range similarly although best results are obtained when the specific resistivity of the electrolyte lies between 0.1 and 10 ohm-cm., better still, between substantially 2 and 10 ohm-cm. The electrode of the present invention consists essentially of nonisometric carbon and may be composed of the allotropic carbons including ordinary graphite and pyrolytic graphite; glassy carbon; amorphous carbon; coal carbon (i.e. ground coal) and mixtures thereof. When reference is made herein to a "homogeneous" non-crystalline carbon electrode, it is to be understood that this description relates to an electrode component of graphite or one of the latter forms of carbon alone or in admixture with one of the others so mentioned; the electrode is thus free from nonconductive isometric-carbon (i.e. diamond) particles as well as metallic particles although carbonaceous materials which have a specific resistivity of the order of $10^{-3}$ to 10 ohm-cm. (e.g. boron carbide and silicon carbide) can be incorporated in the electrode body to form a heterogeneous electrode according to this invention. The electrode and workpiece are urged toward contact under pressure, as mentioned above, and it has been found that pressures ranging between substantially 0.1 and 5 kg./cm.$^2$ are important from the point of view of machining accuracy and efficiency. When this pressure range is discussed, it is understood to refer to the applied pressure which, prior to the development of any gas or vapor pressure in situ to urge the electrode and workpiece slightly apart, is the contact pressure at the interface.

According to a more specific feature of this invention, the machining electrode is a wheel homogeneously composed of noncrystalline carbon and of a conductivity equivalent to a specific resistivity ranging between $10^{-3}$ and 10 ohm-cm. while the electrolyte is an aqueous solution of a water-soluble compound. Suitable water-soluble compounds for use in forming the electrolyte (preferably with a specific resistivity of 2 to 10 ohm-cm.) include potassium acetate (CH₃COOK), sodium acetate (CH₃COONa)

potassium nitrate (KNO₃), potassium nitrite (KNO₂), sodium nitrate (NaNO₃), sodium nitrite (NaNO₂), potassium carboate (K₂CO₃), sodium carbonate (Na₂CO₃), potassium silicate (K₂SiO₃), sodium silicate (Na₂SiO₃), potassium fluosilicate (K₂SiF₆), sodium fluosilicate (Na₂SiF₆)

sodium phosphate (Na₃PO₄), potassium chloride (KCl), sodium chloride (NaCl), sodium hydroxide (NaOH) and the usual oxidizing inorganic acids. Best results are obtained with potasium nitrate or potassium acetate solutions alone or admixed with rust preventatives or the like selected so that, in no case, does the specific resitivity of the electrolyte exceed 10 ohm-cm. Suitable temperatures for carrying out the present range between the freezing and boiling points of the electrolyte although the temperatures between substantially 2° C. and 80° C. have been found to be highly effective and room tempertaure is most practical. The electrolyte can be supplied to the interface in a continuous or intermittent stream, preferably circulated and replenished by addition of electrolyte from time to time or continuously; it is also possible, however, to carry out the present invention in a static electrolyte, i.e. an electrolyte bath maintained wthout replenishment or circulation until the conclusion of the machining operation; in the latter case, the electrode may be provided with formations designed to circulate the electrolyte within the bath.

According to another feature of this invention, the electrode or tool is a wheel whose circumferential or transverse face can be used for the machining operation and is composed essentially of graphite, amorphous carbon or coal carbon throughout. The electrode is advantageously rotated at a speed sufficient to ensure a relative displacement of the electrode and workpiece surfaces at a rate between substantially 5 m./second and 50 m./second, with a relative speed of substantially 20–30 m./second being preferred.

As previously mentioned, the present invention contemplates the application of a pulsating electric current across the electrode and workpiece, preferably with a strong unidirectional component. I have found that this pulsating waveform is advantageous in that it gives rise to the development of spark discharges at the electrolyte pockets in spite of or because of intervening contact of the electrode with the workpiece, this sprak discharge serving to remove and dislodge the oxide film formed on the workpiece. The oxide layer naturally formed on the workpiece and that generated during electrochemical machining by the ion reaction of the workpiece with the electrolyte is characterized by the presence of a multiplicity of pinholes which reach substantially from the electrolyte/ oxide interface to the underlying region of metal, the current density at these pinhole regions being substantially higher than in the regions intermediate the pinholes. Consequently, impulsive current flow across the electrode in the workpiece results in the overloading of thes pinhole carriers and a breakdown which, because of the high impulsive energy of an electric spark and its penetrating action, rapidly strips the oxide layer from the substrate without requiring any significant mechanical or abrasive removal of the oxide. The pulse frequency will range from substantially 50 cycles to 10 kilocycles per second and the pulse can be of sinusoidal, spike or square waveform, as will be apparent hereinafter. In the case of the present invention, therefore, spark-discharge erosion or breakup of the oxide layer replaces the mechanical oxide-removal action which was produced by abrasion in conventional systems using diamond wheels or the like. For all practical purposes, it has been found possible, in accordance with this invention, to employ simple alternating current as the machining power since there is preferential erosion of the metal of the workpiece to the graphite of the electrode.

Aside from the substantial advantages arising from omission of servomechanisms for controlling a machining gap and the elimination of diamond wheels, it may be noted that the present technique permits the apparatus to have significantly reduced size and mass and thus ensures stability without having to take into consideration the need for mechanical abrasion of the workpiece. Furthermore, the finish obtained by the machining operation is substantially better than that which has been obtainable heretofore. For example, electrochemical machining with a gap maintained by a servomechanism or with diamond particles generally results in a roughness of about 10 to 20 $\mu H_{max.}$ while the system of the present invention, in which a gap is dispensed with, permits the roughness to be reduced to the order of 0.5 $\mu H_{max.}$. Furthermore, the machining accuracy and the accuracy of reproduction of the contour of the electrode is significantly greater in the system of the present invention since spurious current flow through electrolyte gap is avoided and undercutting and rounding of the edges of the workpiece are completely eliminated.

The above and other objects, features and advantages of the present invention will become more readily apparent from the following description, reference being made to the accompanying drawing in which.

Figure 1A:
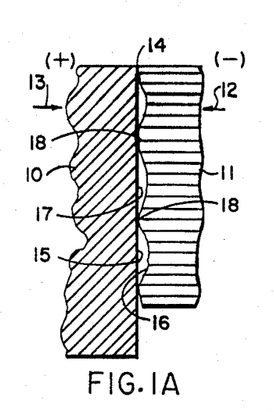
FIG. 1A is a diagrammatic cross-sectional view taken transversely to the interface of a graphite electrode and a workpiece showing the electrolyte pockets thereof.

As can be seen from FIG. 1A, the present invention resides in a system wherein a workpiece 10 and an electrode 11 are initially brought into interfacial contact with a resilient contact pressure represented by the arrows 12 and 13 and described in greater detail hereinafter, the interface being formed at 14 by the juxtaposed surfaces 15 and 16 of the workpiece and electrode, respectively. Inasmuch as these surfaces are not perfectly smooth, they form pockets 17 which receive the electrolyte between zones 18 of closer approach. Since the electrolyte along the interface has substantially the same specific resistivity (or specific conductivity) as the electrode 11, at least at its conductive surface 16, there is no tendency for the current flow between the workpiece and the electrode to be concentrated at the zones 18 of closer approach, and the total current flow is erpresented by the sum of electron and ion currents at these regions of closer approach, and the ion currents through the electrolyte within the pockets. Initially, of course, the regions of closer approach of the electrode are in actual engagement with the workpiece and there are substantially no ion currents in these regions. When, however, current flow commences, there is an in situ evolution of gas which tends to bias the electrode and workpiece slightly away from one another so that the depths of the pockets and the distance of these regions from the workpiece increase correspondingly. Thus, the potential drop at the several regions can be treated as if the actual engagement were maintained. Consequently, a fraction of the total current will pass initially through the regions of direct solid contact and thereafter across the narrow gap and there is only limited electrochemical erosion at these points, whereas the major fraction of the current flow is effective through the electrolyte in the pockets at the interface to oxidize the metallic workpiece substantially irreversibly and thereby effect erosion of the workpiece as the surfaces 15 and 16 are relatively displaced to sweep the pockets and fresh electrolyte across the workpiece surface.

Figure 1B:
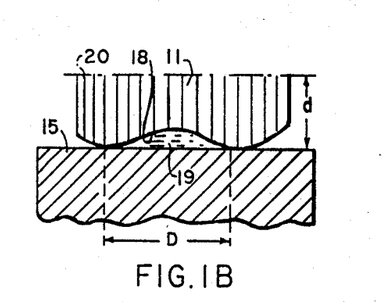
FIG. 1B is an enlarged view of one of the pockets.
Figure 1C:
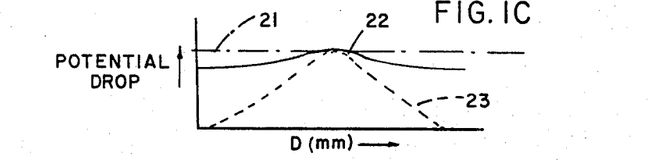
FIG. 1C is a graph of a potential drop across the width of the pocket showing distinguishing features of the system of the present invention.

This phenomenon will be better undestood from FIGS. 1B and 1C, the former showing a pocket at the interface in somewhat diagrammatic form and drawn to an enlarged scale. The distance D across the electrolyte pocket represents the spacing between two zones of initial engagement with the workpiece by the electrode and it will be understood that the zones of closest approach may be annuluses surrounding a pocket but generally are a multiplicity of points spaced randomly on the surface of the electrode and representing locations at which wear of the electrode may have taken place at a slightly slower rate than at other locations, represented by the pockets. Since the specific resistivity of the electrode 11 is substantially equal to or of the order of that of the electrolyte 19 in the pocket 18, which may also be partially or completely formed in the workpiece surface, the potential drop between a base line (equipotential line) 20 and the surface 15, assuming the absence of an oxide layer, is substantially constant and, as measured through the distance D, can be represented by the mean (dot-dash) line 21 of FIG. 1C. If the conductivity of the electrolyte is slightly less than that of the electrode (i.e. greater specific resistivity), the actual potential drop will be that shown by the solid line 22 in FIG. 1C. For the purpose of illustration, the broken line 23 of the graph of FIG. 1C represents the situation which would be present if the electrode were composed of a metal. In this case, the potential drop would fall to zero at the contact points and provide a "dead" short circuit such that substantially no current would flow across the electrolyte. In practice, however, the contact points occur only momentarily as described above although ideally the electrode and workpiece are continuously urged toward such actual engagement.

Figure 2:
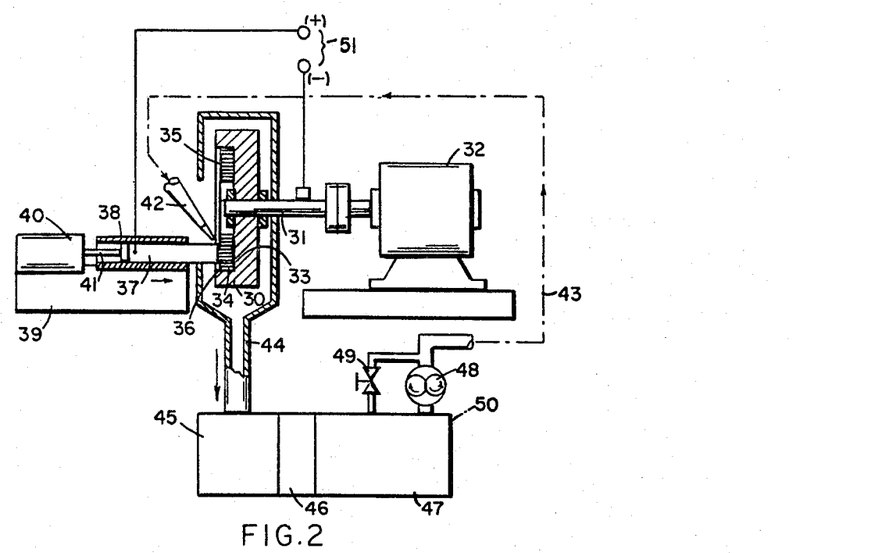
FIG. 2 is a vertical elevational view, partly in section, of an apparatus for the electrochemical grinding of a workpiece.

In FIG. 2, I show an apparatus for the grinding of a workpiece using the principles of this invention as described above. Essentially, this apparatus comprises an electrode holder 30 driven by a shaft 31 of a drive means such as an electric motor 32; the holder is recessed at its front face 33 to receive the electrode 34 which is substantially homogeneously composed of graphite or amorphous carbon. The machining face 35 of this electrode is juxtaposed with the face 36 of a workpiece 37 (e.g. a tungsten-carbide machining tool to be sharpened) which is mounted in a guide 38 of a workpiece-support means 39. The latter is provided with fluid-responsive means such as a hydraulic or pneumatic cylinder 40 whose piston 41 urges the workpiece 37 with an initial contact pressure of substantially 0.1 to 5 kg./cm.$^2$ against the face 35 of the grinder, this force being maintained during the entire machining operation. The fluid-responsive cylinder can, of course, be replaced by a spring-loaded plunger adapted to apply the necessary pressure. A nozzle 42 directs a stream of an electrolyte having substantially the same specific resistivity as the electrode from supply line 43 against the interface, while a collecting means recovers the expended electrolyte. The collecting means is here formed by a hood 44 communicating with a receptacle 45 in which the electrolyte flows through a filter 46 into a fluid-storage reservoir 47 from which it is displaced by a circulating means (pump) 48 to the line 43, a bypass valve 49 being provided to control the flow rate and pressure. To replenish the electrolyte and maintain its specific resistivity within the indicated range of 0.1 to 10 ohm-cm., additional quantities of saline solution or deionized water can be added at 50, as required. A pulsating source of electric current (FIG. 4) is connectable to the terminals 51 and will be described hereinafter, it being understood that when the source supplies an electric current with a strong unidirectional (D.C.) component, the workpiece will be constituted as the anode while the grinding wheel 34 will be constituted as the cathode.

While repeated reference has been made earlier to the substantial identity, in terms of order of magnitude, of the electrode and electrolyte resistivities, it must be emphasized that the value given for the electrolyte resistivity (0.1 to 10 ohm-cm.) is the condition in a static state of the system. During actual machining, i.e. during relative displacement of the electrode and workpiece surfaces and the passage of an electric current through the film of electrolyte between these surfaces, there are indications of a transient alteration of the specific resistivity of the electrolyte (probably due to ionization or electrolytic breakdown). Thus, in practice, the specific resistivity of the electrolyte during the machining operation appears to decrease dynamically and to approach the specific resistivity of the electrode; the specific resistivity of the latter may, therefore, be an order of magnitude less than that of the electrolyte during incipient electrochemical grinding with the electrolyte conductivity increasing upon further machining as indicated. When the static specific resistivity is 0.1 to 10 ohm-cm., best results are obtained during dynamic machining and the dynamic resistivity of the electrolyte appears to approach closely the specific resistivity of the electrode.

EXAMPLE I

A tungsten-carbide workpiece in the form of a block is machined with a 6-inch graphite wheel having a specific resistivity of $1.2 \times 10^{-3}$ ohm-cm. with a peripheral speed at juxtaposition with the workpiece of 25 meters/sec., using an electrolyte (15% aqueous potassium nitrate) with a specific resistivity of 2 to 3 ohm-cm. The electrolyte was circulated substantially as illustrated in FIG. 2 and supplied to the interface at a rate of substanitally 0.5 liter per minute at a temperature at 25° to 35° C., the workpiece was brought from below into engagement with the circumference of the grinding wheel which extended to a depth of substantially 1.5 mm. beyond the upper surface of the workpiece (FIG. 5) which was advanced on a table with a speed of 5 mm./minute toward the grinding wheel. A machining rate of substantially 0.9 gram/minute was obtained with a current of 120 amperes over a machining area of 1.2 cm.$^2$ with the current supply being 50-cycle alternating current at approximately 10 volts. The pressure with which the electrode and the workpiece were urged together was 2 kg./cm.$^2$. A spark discharge with a repetition rate of about 50 per second was obtained even though the workpiece and the electrode were in momentary engagement from time to time, as noted. During machining, evolution of gases at the interface resulted in the development, in situ of a gap on the order of a hundredth (0.01) millimeter between intervals of actual engagement.

EXAMPLE II

Using an apparatus of the type illustrated in FIG. 2, a titanium-carbide workpiece 37 whose end face 36 is rectangular with a width of 30 mm. and a height of 10 mm. is machined with a graphite wheel 34 whose specific resistivity is $1.2 \times 10^{-3}$ om-cm. At the region of juxtaposition with the workpiece, the wheel has a diameter of 150 mm. A 50-cycle alternating current is applied across the workpiece and the electrode with a voltage ranging between 3 and 4 volts and varying during machining operation. A current of 110–120 amps is supplied. The electrolyte was that of Example I.

Figure 3:
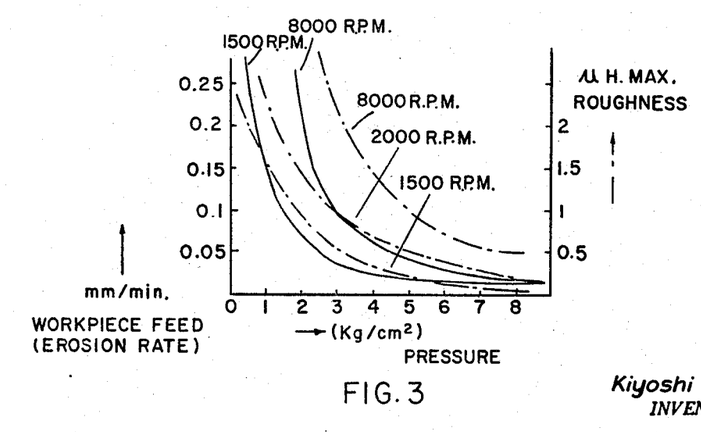
FIG. 3 is a graph showing relationships between workpiece feed, contact pressure and roughness, according to an embodiment of this invention.

In FIG. 3, I show the relationship in Example II of the feed pressure (plotted along the abscissa in kg./cm.$^2$) to the erosion rate (mm. of workpiece feed per minute) at the left-hand ordinate. The latter dimension is, of course, a measure of the maximum height of surface irregularities. The dot-dash curves show the roughness as a function of the feed pressure tending to urge the electrode and workpiece into direct contact for various angular velocities of the wheel, while the solid-line curves are plots of the workpiece-feed rate as a function of contact pressure. I have found that optimum results from the point of view of both tolerable roughness and high machining rate are obtained when the pressure ranges between 0.1 and 5 kg./cm.$^2$ although higher pressures are possible with a reduction in machining rate.

Figure 4:
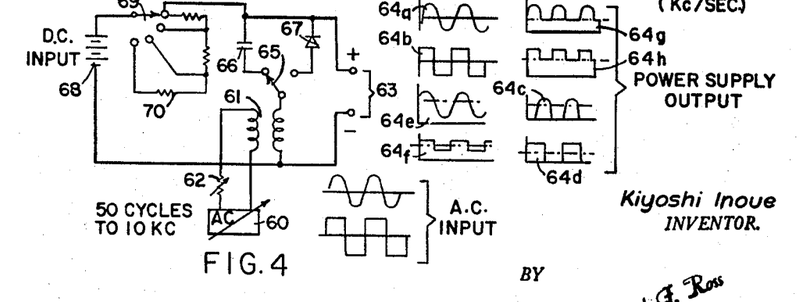
FIG. 4 is a circuit diagram of a power supply suitable for use with any of the systems described in connection with the principles of this invention.

In FIG. 4, I diagrammatically illustrate a possible power supply suitable for use with the apparatus of FIG. 2 and connectable across the terminals 51 thereof, while maintaining the indicated polarity relationship, when the power supply provides a strong unidirectional or D.C. component. It will be understood, however, that the power supply can include any conventional type of pulse generator, preferably one with an adjustable frequency for the selection of the pulse-repetition rate. Thus, an astable multivibrator can be used to trigger a plurality of parallel-connected transistor switches in circuit with a D.C. source, the grinding wheel and the workpiece. Alternatively, the D.C. source may be formed by a rectifier arrangement supplied by an alternating-current source and having a saturable-reactor control network for regulating the power supply to the grinding setup. The power supply may also merely be a source of line alternating current as will become apparent hereinafter.

The power supply of FIG. 4 comprises a variable-frequency oscillator, a line plug or other alternating-current source 60 which is connected across the primary winding of an isolation transformer 61 in series with a variable-impedance element, e.g. a potentiometer 62, for controlling the amplitude of the A.C. supplied. The secondary winding of the isolation transformer can be connected across the electrode and workpiece via the terminals 63 to supply thereto a sinusoidal waveform of the type shown at 64$a$. When the A.C.-source 60 is a conventional square-wave generator, the pulse form supplied to the terminals 63 will be of the type shown at 64$b$. It will be understood that these waveforms have no substantial unidirectional component and, surprisingly, the apparatus of the present invention does not require this unidirectional component although an electrolysis is involved. Apparently, this is a consequence of the fact that the anodization portions of the waveforms result in oxidation of the metallic workpiece (e.g. a conversion of iron to iron oxide, titanium to titanium oxide and tungsten to tungsten oxide) in a substantially irreversible manner so that the cathodization portions of the waveform have little effect in redepositing the metal.

For the machining of tungsten, for example, it is found to be desirable to maintain an alkaline pH at the interface between the workpiece and the electrolyte, preferably, above pH 10; this assists in the formation and removal of tungsten metal in the form of the tungsten oxides when tungsten carbide is being machined. Thus the power supply includes a switching element designed to switch over the source from a pure alternating current to a pulsating current having a strong D.C. component. Such a switch means is shown at 65 and can selectively connect the secondary winding of transformer 61 in series with a D.C. blocking capacitor 66, which delivers the wave forms 64$a$ and 64$b$ to the apparatus, or a rectifier means 67 which passes only the positive or anodization pulses. The waveforms derived through the use of rectifier 67 are indicated at 64$c$ and 64$d$ from which it may be seen that the machining current will have a mean D.C. component represented by the dot-dash lines of these latter graphs.

It is, however, also possible to provide a further source of direct current, here represented by a battery 68 which can be superimposed upon the pulsating output of source 60. Since it has been found desirable to adjust the relative contribution of the D.C. source and the A.C. source in accordance with the particular workpiece being machined, e.g. to use a larger D.C. component when tungsten carbide is machined than when high-speed steel is treated, a switch 69 settable for the particular workpiece material can be provided. The switch 69 can connect various resistances 70 in series with the D.C. source 68 so as to vary the magnitude of the D.C. component. In the superimposition of D.C. upon sinusoidal or square-wave alternating current, the waveforms indicated at 64$e$ and 64$f$ are obtained respectively. When the pulsating signal is a partially rectified alternating current and is superimposed upon the D.C. component, the waveforms indicated at 64$g$ and 64$h$ are obtainable.

Figure 5:
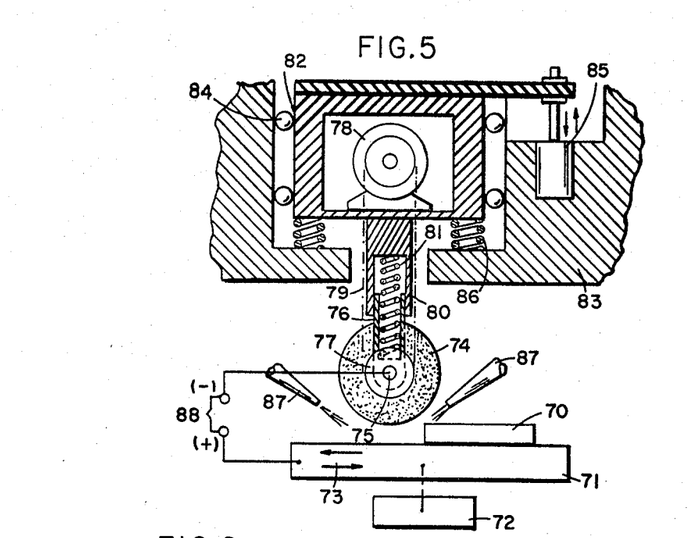
FIG. 5 is a view similar to FIG. 2, illustrating a surface-grinding apparatus according to the invention.

FIG. 5 shows a surface-grinding apparatus employing the principles of the present invention. In this apparatus, the workpiece 70 is carried by a table 71, which may be magnetic in the usual manner for retaining the workpiece and is vertically displaceable by a crank or motor mechanism represented at 72. The table 71 is also reciprocable horizontally as represented by arrows 73 beneath a graphite "grinding" wheel 74 which is mounted upon a shaft 75 in a vertically movable support 76. The pulley 77 of this shaft is connected with a drive motor 78 by a belt 79 which may be elastic to permit vertical movement of the grinding wheel 74. The support 76 of the latter is received in a sleeve 80 containing a compression spring 81 and mounted upon a motor housing 82 which is guided in a head 83 by bearings 84. A hydraulic cylinder or other means 85 is adapted to displace the housing 82 against the force of compression springs 86 in the vertical direction to load the spring 81 and thereby establish the pressure with which the wheel 74 is urged toward the workpiece 70. The electrolyte is directed at the interface between the workpiece and the electrode by a plurality of nozzles 87 with the electrolyte being connected as indicated in FIG. 2 and recirculated in the nozzle. The terminals 88 of the device can be tied to the output terminal 63 of the power supply of FIG. 4, observing the indicated polarity relationship.

EXAMPLE III

In a surface-grinding apparatus of the type illustrated in FIG. 5, a high-speed steel workpiece 70 is machined by a graphite wheel 74 consisting homogeneously of ordinary graphite with a specific resistivity of $1.2 \times 10^{-3}$ ohm-cm. The wheel has a peripheral speed of 25 m/second and the electrolyte of Example I is employed at a temperature of 25–35° C. The electrode-feed is maintained at 2 kg./cm.$^2$ over a machining area of 1.2 cm.$^2$ and the depth of cut is about 1.5 mm. at a table speed of 5 mm./minute. The machining current of 120 amps. was 50-cycle A.C. at approximately 10 volts. The rate of material removal from the workpiece was substantially 0.9 gr./minute.

Figure 6:
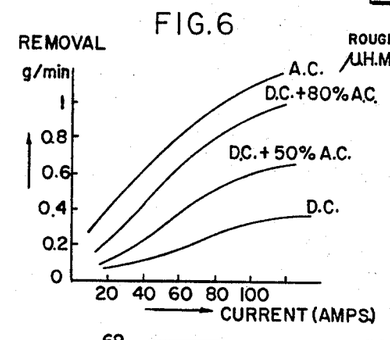
FIG. 6 is a graph showing the relationship between machining rate and machining current with different machining-voltage characteristics.

The importance of using a pulsating source of current will be apparent from the graph of FIG. 6 wherein the removal rate in grams/minute is plotted along the ordinate against the machining current along the abscissa for a pure direct-current supply, a machining current whose total power included 50% A.C. power and 80% A.C. power, respectively, and pure alternating current.

Figure 7:
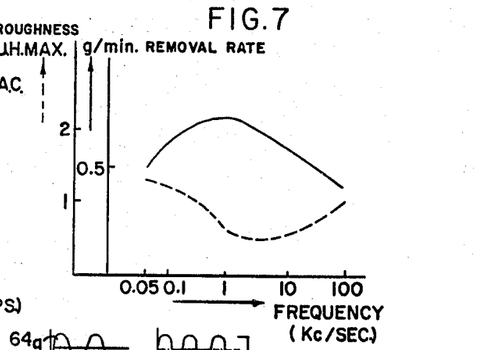
FIG. 7 is a graph showing the relationship between roughness and the machining rate and the frequency of the applied pulses.

In FIG. 7, I show the relationship between the removal rate, plotted along the ordinate and represented by the solid-line curve, and the frequency of the pulsating source. In practice, it has been found that the optimum removal rates are obtained with a pulsating source with a pulse-repetition frequency of 50 cycles to 10 kilocycles/second. The roughness in $\mu H_{max.}$ is also plotted as a function of frequency and is represented by the broken-line curve.

As previously noted, an important feature of this invention resides in the fact that the graphite or amorphous-carbon wheels used in this process are relatively inexpensive and can be readily shaped by molding or conventional machining unlike diamond-containing wheels.

Figure 8:
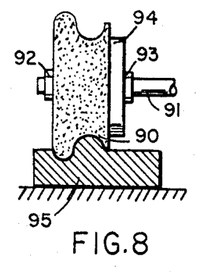
FIGS. 8 and 9 illustrate different grinding wheels according to the present invention.

In FIG. 8, I show a contoured graphite wheel 90 mounted upon a mandrel 91 by nuts 92 and 93 holding the graphite wheel 90 against a backup plate 94. A substantially faithful reproduction of the contour, in complementary configuration, is obtained in the workpiece 95 during a surface machining operation with an apparatus of the type illustrated in FIG. 6. The carbon electrode can also be a substantially solid disk 96 (FIG. 9) secured to the support plate 97 by bolts 98, this plate being mounted in turn upon a shaft 99. The workpiece can be fed against either the peripheral surface 100 or the transverse surface 101 of the disk.

Figures 9, 10:
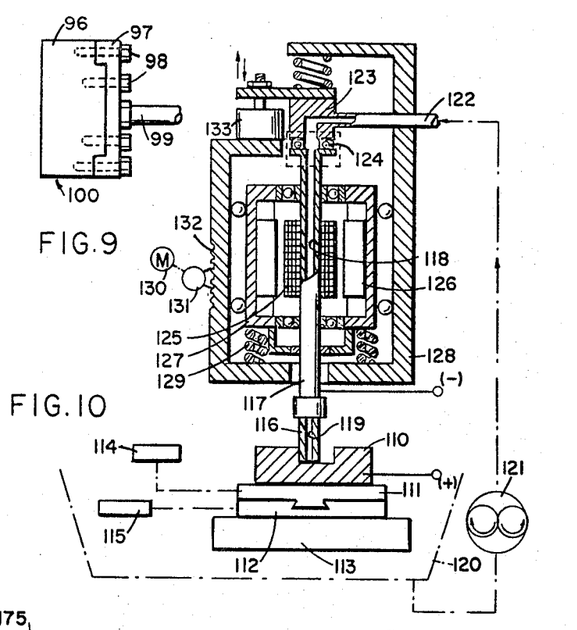
FIG. 10 is a vertical cross-sectional view through a milling-type apparatus using the method of the present invention.

In FIG. 10, I show a milling apparatus using the principles of the present invention. In this apparatus, the workpiece 110 is mounted upon a table 111 which, in turn, is mounted on a cross-feed carriage 112 on the machine support 113. Conventional manual or automatic drives 114, 115 are provided for the longitudinal displacement of the table 111 and the transverse displacement of the carriage 112, respectively. In this arrangement, the electrode is a tubular amorphous-carbon body 116 received in a stem 117 and rotatable about a vertical axis. The stem 117 is provided with an axial bore 118 which communicates with the interior 119 of the tubular electrode 116 for delivering electrolyte to the interface. The electrolyte, recovered from a collecting means diagrammatically represented as a pan 120, is delivered by a circulating pump 121 to a pipe 122 which feeds a nonrotatable head 123 at the upper end of the shaft 117. This head 123 is connected by a rotating seal or gland 124 with the shaft 117, thereby permitting substantially free rotation of the latter without leakage of electrolyte. The shaft 117 carries the armature windings 125 of an electric motor whose field coils 126 are contained within a housing 127 surrounding the shaft 117 and held against rotation in the support 128. The housing 127 is carried within the vertically displaceable support 128 by springs 129. The vertical feed of the "miller" is provided by a motor 130 whose pinion 131 is designed to advance the rack 132 formed on the support 128 in vertical direction. A fluid-responsive or spring mechanism 133 is designed to apply the necessary contact pressure with which the electrode 116 of the "miller" is urged toward the workpiece 110. The apparatus operates generally as previously described.

Figure 11:
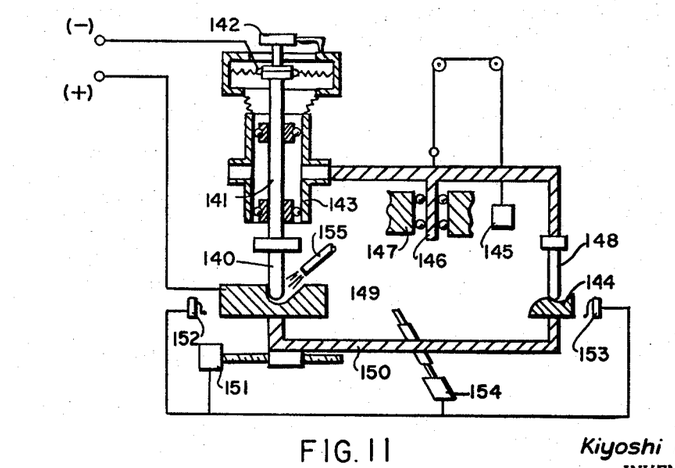
FIG. 11 is another vertical cross-sectional view diagrammatically showing a copying-type electrochemical miller.

In the modification of FIG. 11, the rod-shaped homogeneous graphite electrode 140 is rotatable about a vertical axis on the shaft 141 by a motor 142. The shaft 141 is vertically displaceable with its support 143 in accordance with the configuration of a template 144, which may be a previously machined article whereby the apparatus constitutes a copying tool. A counterweight 145 controls the downward force (i.e. feed pressure) applied to the electrode 140 in the direction of the workpiece and may be adjusted by adding or removing weights. The support 143 is guided vertically by a rod 146 in a bracket 147 and has a follower 148 of substantially the same configuration as the electrode in contact with a template 144. The template 144 and the workpiece 149 are carried on a table 150 displaceable in mutually perpendicular directions by motors 151, 154 controlled by limit switches 152, 153, electrolyte being delivered at 155.

Figure 12:
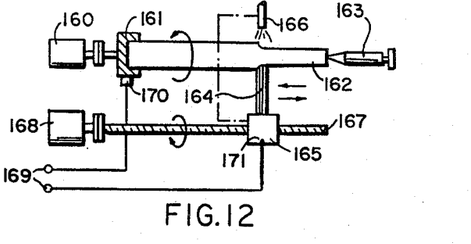
FIGS. 12–14 are diagrammatic axial cross-sectional views showing different arrangements for effecting the relative movement of the electrode and the workpiece and for producing contoured bodies which are axially symmetrical.
Figure 13:
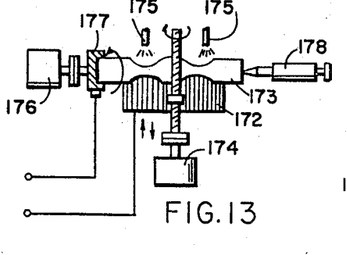
Figure 14:
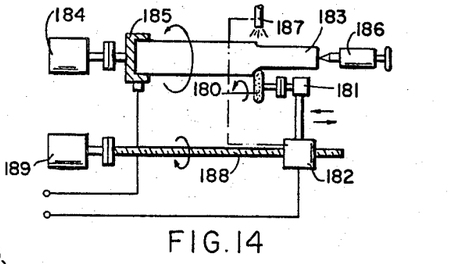

In FIGS. 12–14, I show modified arrangements wherein at least part of the relative displacement of the electrode and the workpiece is effected by rotating the electrode. These systems are particularly satisfactory for workpiece configurations which are axially symmetrical. Thus, I show in FIG. 12 an electrochemical lathe whose headstock includes a motor 160 which drives a chuck 161 which received the metallic workpiece 162, here shown as a cylindrical rod. The other extremity of the workpiece 162 is supported by a tailstock 163. The graphite electrode 164 is mounted in the longitudinal carriage 165 of the device together with a nozzle 166 which supplies electrolyte to the interface and is springloaded against the workpiece in a manner not illustrated. The carriage 165 is driven by a lead-screw 167 whose motor is shown at 168 and the machining current is supplied to the device from the terminal 169 by a brush 170 and a fixed contact 171. In the modification of FIG. 13, the graphite electrode 172 is contoured and is fed with pressure toward workpiece 173 by a crossfeed 174 while the nozzles 175 are stationary. The workpiece 173 is rotated by a motor 176 between the chuck 177 and the tailstock 178.

FIG. 14 illustrates a lathe-type grinder wherein the graphite wheel 180 is rotated by a motor 181 mounted on the longitudinal carriage 182 in a sense opposite the sense of rotation of the workpiece 183 so as to increase the rate of relative displacement. The workpiece 123 is driven by motor 184 and is held in the chuck 185 thereof with support from the tailstock 186. Here, too, the nozzle 187 for supplying electrolyte to the interface is carried by the carriage 182 whose lead screw 188 is operated by a motor 189.

It has been observed that best results are obtained when the electrode is composed of graphite whose crystal planes lie transverse to the surface being machined but which has been formed by compression of comminuted graphite perpendicularly to these planes. Thus, the direction of workpiece feed is parallel to these planes. Moreover, it has been observed that there is a relationship between the electrode wear calculated in percent of workpiece wear, and the sintering temperature of the graphite electrode after compression thereof. Best results are obtained, as indicated in FIG. 15, when the electrode is sintered at a temperature between substantially 1000° and 1700° C.

EXAMPLE IV

An electrode suitable for use in the previous examples and any of the apparatus described above is obtained by compressing graphite flakes in a mold shaped in accordance with the desired contours of the article at a pressure of $5 \times 10^3$ kg./cm.$^2$ transverse to the grain, i.e. perpendicular to the planes of the platelets. Thereafter, the electrode was sintered at a temperature of about 1200° C. to coherence. Machining was effected by urging the workpiece in the direction of the grain with the interface extending transversely thereto. A minimum electrode wear was obtainable.

Figures 15, 16:
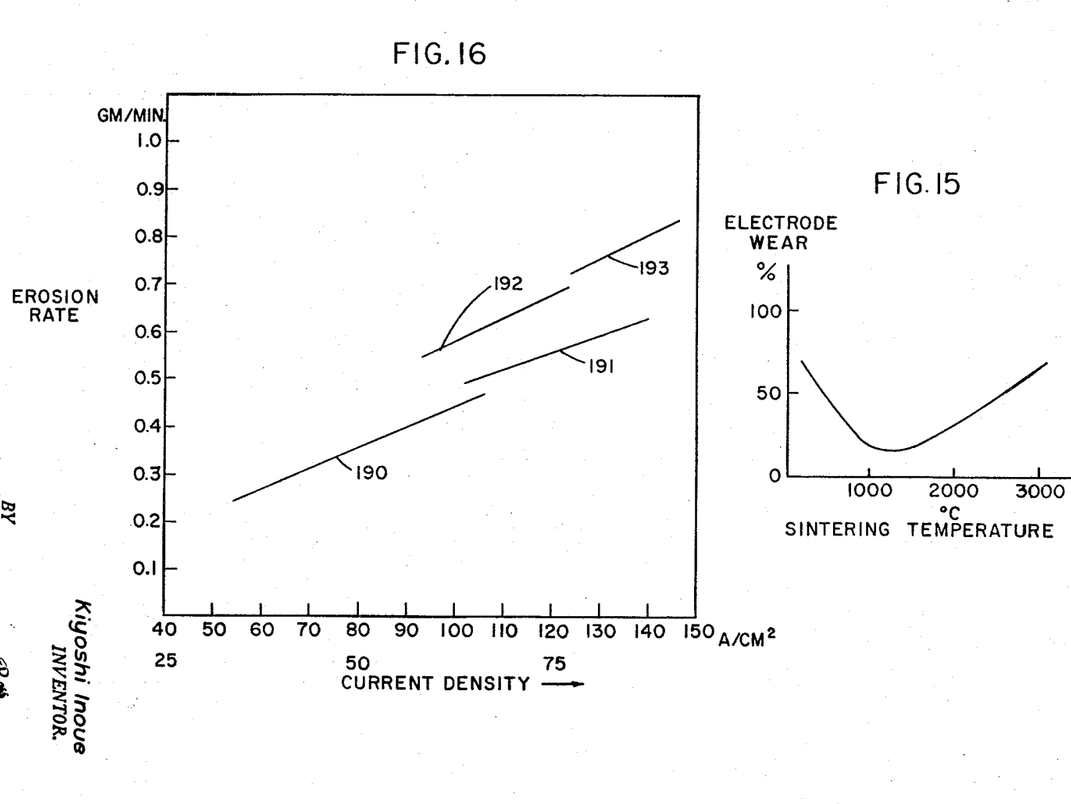
FIG. 15 is a graph explaining characteristics of a preferred type of electrode, according to this invention.
FIG. 16 is a graph showing the relationship between a machining rate and current density for various voltages applied across the electrode and the workpiece in accordance with the principles of this invention.

In FIG. 16, I show the results obtained at progressively increasing current densities plotted as the abscissa against the erosion rate plotted as the ordinate for various machining conditions. The workpiece was titanium carbide and the electrolyte an aqueous solution containing 10% by weight potassium nitrate and 5% by weight sodium carbonate. The electrode has a diameter of 150 mm., was driven at 3000 to 4000 r.p.m. and was composed of glassy carbon sintered as indicated above. The curve 190 represents the results obtained using a workpiece-feed pressure of 0.8 kg./cm.$^2$ while curves 191, 192 and 193 represent the results obtained at feed pressures of 1.3, 1.6 and 1.9 kg./cm.$^2$ respectively, all with a potential on the order of 12 volts.

The invention described and illustrated is believed to admit of many modifications within the ability of persons skilled in the art, all such modifications being considered within the spirit and scope of the appended claims.

I claim:
1. A method of electrochemically removing material from a conductive workpiece, comprising the steps of:
    juxtaposing a conductive electrode surface with a surface of said workpiece;
    urging one of said surfaces toward the other of said surfaces to form a common interface between said surfaces;
    supplying to said interface an electrolyte having a specific resistivity substantially of the order of that of said electrode surface, thereby forming pockets of said electrolyte at said interface;
    relatively displacing said surfaces while continuing to urge said one of said surfaces toward said other surface; and
    applying an electric current across said interface between said surfaces electrochemically to erode material from said workpiece.

2. The method defined in claim 1 wherein said conductive electrode surface is formed by a substantially homogeneous carbon electrode having a specific resistivity up to about 10 ohm-cm.

3. The method defined in claim 2 wherein said electrode is composed essentially of graphite or amorphous carbon.

4. The method defined in claim 3 wherein said electrode has a specific resistivity ranging between 0.001 and 10 ohm-cm.

5. The method defined in claim 2 wherein said electrolyte is an aqueous solution of an inorganic compound and has a specific resistivity of substantially 0.1 to 10 ohm-cm.

6. The method defined in claim 5 wherein said inorganic compound is selected from the group consisting of potassium nitrate, potassium nitrite, sodium nitrate, sodium nitrite, potassium carbonate, sodium carbonate, potassium silicate, sodium silicate, potassium fluosilicate, sodium phosphate, potassium chloride, sodium chloride, sodium hydroxide, potassium acetate and oxidizing inorganic acids.

7. The method defined in claim 5 wherein the specific resistivity of said electrolyte is substantially 2 to 10 ohm-cm.

8. The method defined in claim 2 wherein said one of said surfaces is urged toward said other surface with a pressure of substantially 0.1 to 5 kg./cm.$^2$, said surfaces being relatively displaced by rotating said electrode surface.

9. The method defined in claim 8 wherein said electric current has a pulse frequency ranging between substantially 50 cycles per second and 10 kilocycles per second, said electric current further generating spark discharge between said surfaces for penetrating and dislodging oxide films formed on said workpiece surface.

10. The method defined in claim 9 wherein said electrode surface is displaced at a rate of substantially 5 to 50 meters per second at least in the region of juxtaposition with said workpiece surface.

11. The method defined in claim 10 wherein said electric current has a substantial direct-current component with said workpiece surface being rendered relatively positive and said electrode surface relatively negative.

12. The method defined in claim 11, further comprising the step of adjusting the rate of oxide formation at said workpiece surface by selectively regulating the magnitude of said direct-current component.

13. A method of electrochemically removing material from a conductive workpiece, comprising the steps of:
    juxtaposing a homogeneous conductive graphite electrode surface with a surface of said workpiece;
    urging one of said surfaces toward the other of said surfaces with a pressure of substantially 0.1 to 5 kg./cm.$^2$;
    supplying between said surfaces an electrolyte having a specific resistivity of substantially 0.1 to 10 ohm-cm. and substantially of the order of that of said electrode surface, thereby forming pockets of said electrolyte at said interface;
    relatively displacing said surfaces while continuing to urge said one of said surfaces toward said other surface; and
    applying an electric current across said surfaces electrochemically to erode material from said workpiece whereby the only gap between said surfaces is formed in situ only by the application of said electric current across said interface.

References Cited
UNITED STATES PATENTS
2,974,215  3/1961  Inoue _______________ 219—6₵

ROBERT K. MIHALEK, *Primary Examiner.*

U.S. Cl. X.R.

219—68